United States Patent Office  3,221,434
Patented Dec. 7, 1965

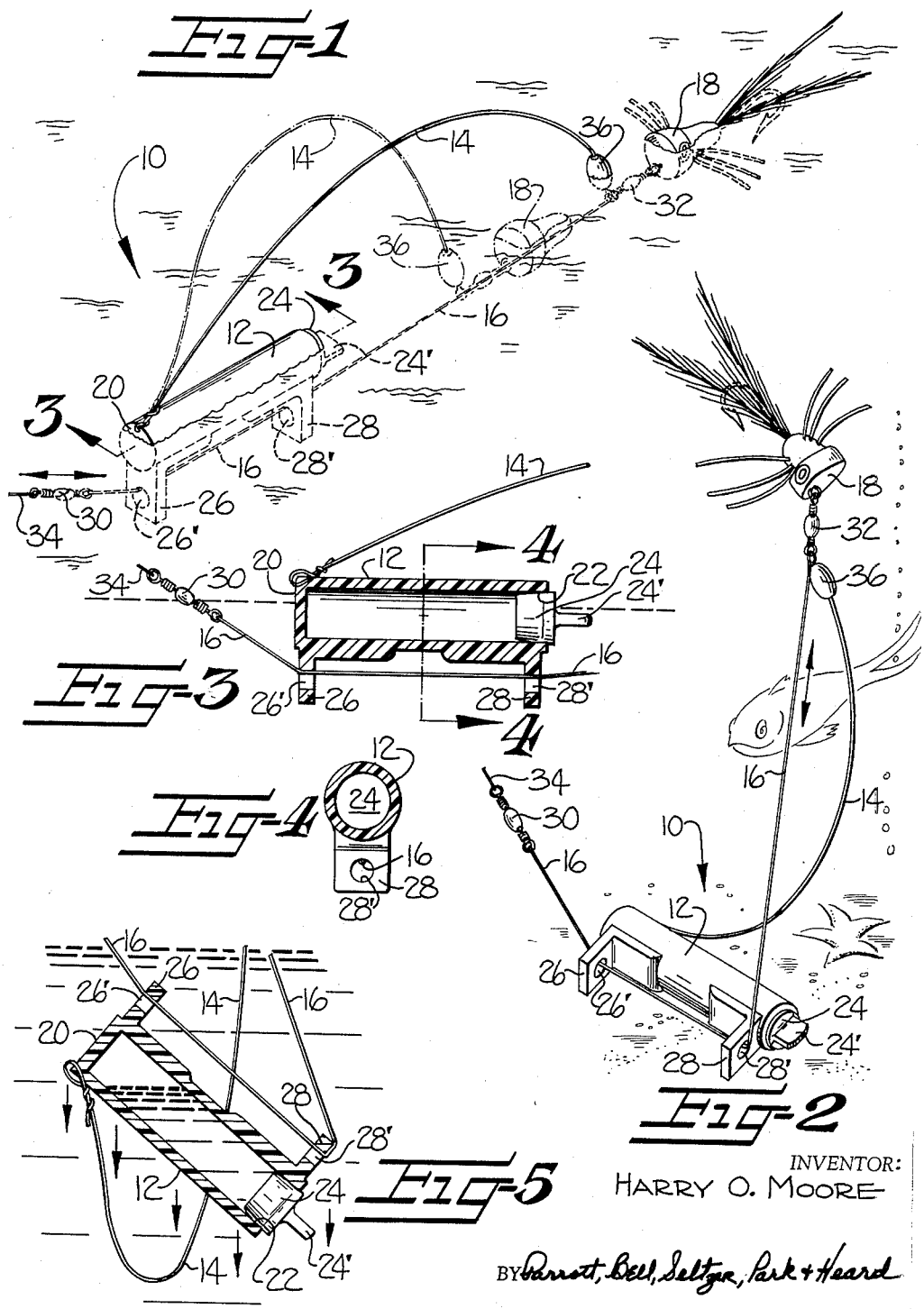

3,221,434
FISHING RIG
Harry O. Moore, Charlotte, N.C., assignor of fifty percent to Walter F. McCall, Charlotte, N.C.
Filed May 6, 1964, Ser. No. 365,374
11 Claims. (Cl. 43—42.02)

This invention relates to a fishing rig adapted to employ and be used in connection with a lure of any desired type for the purpose of assisting a fisherman in imparting fish-attracting movement to the lure while maintaining the same in a particular desired area of a body of water.

A customary manner of fishing many types of lures, of which a "popping bug" is illustrative, is for the fisherman to cast the lure into a particular desired area of the water believed to contain fish, and to thereafter impart small fish-attracting movements to the lure by spasmodically retrieving the line, as by slightly elevating the tip of the rod or pole or by use of the reel, if one is employed. The impartation of this fish-attracting movement to the lure, while highly desirable if not mandatory if the fishing endeavor is to meet with any success, necessarily causes the lure to be moved progressively inwardly toward the fisherman and away from the desired fishing area in which it was originally cast. Consequently, after fishing in the described manner for a brief period of time, the fisherman must fully retrieve the lure and then re-cast the same out in order to again position it within the desired fishing area. This procedure results in the expenditure of a great deal of wasted time and effort, particularly where, as is frequently the case, the desired fishing area is adjacent vegetation or other obstructions rendering it difficult to accurately cast the lure thereto or completely retrieve it therefrom.

With the foregoing in mind, a primary object of this invention is the provision of a fishing rig which permits fishermen to impart the customary fish-attracting movements to a lure for an indefinite period of time without moving the lure from the desired fishing area to which it was originally cast.

Another object is the provision of a fishing rig of the foregoing type which additionally itself imparts fish-attracting movements to the lure, such movements acting in conjunction with but not impeding those imparted to the lure by the fisherman.

A further object is the provision of a fishing rig of the type described which is capable of being utilized either upon or below the surface of a body of water, although particularly suitable for surface use.

A related object is the realization of the foregoing objectives in a rig which, additionally, can be cast with no greater difficulty and fear of line entanglement than when employing a lure alone.

Still other objects and advantages will be in part evident and in part pointed out hereinafter in the following description of an illustrative embodiment of the invention, which should be read in connection with the accompanying drawing, in which:

FIGURE 1 is a perspective view of a fishing rig embodying the invention in use upon the surface of a body of water;

FIGURE 2 is a perspective view of the rig in use upon the bottom;

FIGURE 3 is a vertical section taken approximately along the line 2—2 through one component of the rig shown in FIGURE 1;

FIGURE 4 is a vertical section taken approximately along the line 4—4 of FIGURE 3; and FIGURE 5 is a sectional view similar to FIGURE 3 but showing the component in a partially filled condition and descending through the body of water.

Referring more particularly to the drawings, the fishing rig indicated in its entirety by the numeral 10 consists generally of a hollow body member 12, elongate resilient wire means 14, leader means 16 and a lure 18. While the lure shown in the drawing is of the floating, artificial type generally known as a "popping bug," in association with which the use of the present rig has been found to be particularly advantageous, no general restriction to this particular type is intended and the word "lure" should be deemed, unless otherwise qualified, to encompass all types of fishhook-equipped natural and artificial baits.

Body member 12 of rig 10 consists of an elongate hollow cylinder or tube having its inner end permanently closed by an integral end wall 20 and an opening 22 at its other, outer end sealed by removable plug means in the form of a tapered stopper 24. The latter is preferably provided, as shown, with an integral flange 24' extending outwardly therefrom for the purpose of facilitating its insertion within and removal from the opening 22. Secured to or formed integrally with opposite end portions of the curved outer surface of body member 12, so as to project normally therefrom in parallel spaced relationship to each other, are a pair of lug members 26, 28 having bores 26', 28' respectively, extending therethrough. Bores 26', 28' are so disposed that their axes are in alignment and extend in spaced parallel relationship to the main longitudinal axis of body member 12. Body member 12, including stopper 24 and lugs 26, 28, is formed of transparent but strong material, such as "Plexiglas," so as to present an unobstrusive appearance yet resist breakage when in use, and has a buoyancy such that it will when empty float upon the surface of a body of water. It should be noted that while thus floating, member 12 will automatically assume the position illustrated in FIGURES 1 and 3, in which lug members 26, 28 extend vertically downwardly due to their weight and offset position.

In addition to thus regulating the position of the floating body member 12, lug members 26, 28 additionally and primarily function as eyelet means for the reception of leader means 16 of rig 10. As is best shown in FIGURE 1, leader means 16 comprises a length of any suitable type of line passed through the bores 26', 28' of lug members 26, 28, and is preferably provided at its opposite ends with conventional swivel members 30, 32. The inner swivel member 30 is in turn attached to the fishing line 34 leading to the rod, reel, pole or other tackle employed by the fisherman, while the outer swivel member 32 is attached to lure 18. By reference particularly to FIGURES 3 and 4, it will be noted that the diameter of bores 26', 28' is considerably greater than the diameter of leader 16, such that the latter passes quite loosely through the former. Longitudinal movement of the leader through the bores is therefore in no way impeded or restricted, and body member 12 is largely or totally unaffected thereby.

Resilient wire 14 of rig 10 may be formed of any suitable metal having the desired spring-like quality and good resistance to corrosion. One end of wire 14 is permanently attached in any suitable manner to that upper surface of body member 12 diametrically opposite lugs 26, 28, preferably adjacent the inner end of body member 12 closed by wall 20 thereof. From its point of attachment to body member 12, wire 14 extends generally longitudinally thereof toward and considerably beyond the outer end of the body member, and is attached at its free end to the swivel member 32 interconnecting leader 16 and lure 18. The free end portion of wire 14 may be provided with a small cork 36 or other buoyant member to offset any small amount of additional weight imposed thereby upon swivel member 32 and lure 18. While not mandatory in all instances, the provision of cork 36 has been found to be desirable when employing an extremely small floating lure, such as a "dry fly," to prevent the same from being inadvertently submerged.

In its normal relaxed condition, wire 14 occupies a position such as shown in solid lines in FIGURE 1, in which its outer end and lure 18 are spaced a considerable distance from body member 12. The resiliency of the wire is such, however, as to permit its outer end and the lure connected thereto to be moved inwardly toward body member 12 under the impetus of leader means 16 upon retrieving of line 34. That is, the resiliency of wire 14 is sufficiently less than the resistance of the relatively massive body member 12 to movement through the water that retrieving of line 34 merely increasingly deflects or bows the wire, as indicated in phantom lines in FIGURE 1, and leaves the body member completely or substantially stationary in the water. From the foregoing it will be appreciated that the resiliency of wire 14 need not and should not be great, but rather just sufficient to insure the return of its outer end and the lure 18 connected thereto to the solid-line position of FIGURE 1 at such times as leader means 16 is in a slack or untensioned condition.

By reason of the attachment of the inner end of wire 14 to the inner end of body member 12, it will be appreciated that the terminal portions of the wire can never be brought into engagement with each other, but rather will always be spaced apart by the length of the body member. Excessive bowing of the wire such as might exceed its elastic limit is therefore avoided.

In using the rig 10 shown in FIGURE 1, swivel member 30 is attached to the outer end of a fishing line 34 associated with and retrievable by any desired type of tackle, such as a conventional rod and reel (not shown). As the fisherman elevates his rod preparatory to casting, the vertical position then naturally assumed by rig 10 causes body member 12 thereof to slide downwardly by gravity along leader 16 to its point of connection with wire 14. The more compact nature thus assumed by the rig at this time enables the fisherman to cast the same into a desired area of the water with no greater difficulty or likelihood of line entanglement than that inherent in casting a conventional lure by itself. When at the end of the casting operation the rig strikes the water and tension in the fishing line is relaxed, the components of the rig automatically assume the relative positions shown in full lines in FIGURE 1: that is, body member 12 is rotated about its longitudinal axis by the lug members 26, 28 to a position in which the resilient means 14 is uppermost, and lure 18 is moved outwardly away from body member 12 by the return of resilient means 14 to its normal relaxed condition. The lure 18 now being upon the surface of the water in the desired area, the fisherman may commence imparting fish-attracting movement thereto in a conventional manner, as by spasmodic rotation of his reel or elevation of the tip of his rod or pole, the effect in either case being to slightly retrieve line 34 and thereby move the lure 18 attached by leader means 16 to the outer end thereof along the surface of the water in an inward direction. The small increments of inward movement thus imparted to lure 18 would conventionally result in the lure soon being moved from that desired area of the water into which it was originally cast. This undesirable result is obviated by use of rig 10, since the inward movement of lure 18 causes the same to approach body member 12 and bow wire 14, whereby upon relaxation of the fishing line 34 the resiliency of the wire causes its free end and the lure to be again returned outwardly to their full-line positions of FIGURE 1. The return movement of the lure under the impetus of wire 14 will itself tend to attract fish and may be rendered more spasmodic, if desired, by the fisherman periodically slightly tensioning line 34 as it transpires. The lure is therefore maintained within the selected area of the water for as long as might be desired by the fisherman, and moreover bi-directional fish-attracting movements are imparted thereto rather than merely the uni-directional movements heretofore possible.

While the rig 10 is deemed particularly suitable for surface utilization such as heretofore described and as shown in FIGURES 1 and 3 of the drawing, it also can be used for bottom fishing, as indicated in FIGURE 2, merely by removing stopper 24 and filling body member 12 with water. By filling body member 12 to less than its maximum capacity and thus causing the same to sink quite slowly, it is even possible to fish areas intermediate the surface and the bottom of the body of water.

It will thus be seen that there has been provided a fishing rig realizing the objects and possessing the advantages hereinbefore noted, along with many practical benefits. While a preferred embodiment of the invention has been shown and described, it should be understood that this was for purposes of illustration only, and not for purposes of limitation, the scope of the invention being defined in the following claims.

That which is claimed is:

1. A fishing rig adapted to be used in connection with a retrievable fishing line, comprising:
   (a) a lure;
   (b) a body member having eyelet means thereon;
   (c) elongate resilient means connected at its respective opposite ends to said body member and said lure for resiliently maintaining said lure a spaced distance outwardly away from said body member;
   (d) elongate leader means adapted to be connected at its inner end to the fishing line and connected at its outer end to said lure and passing loosely through said eyelet means of said body member for moving said lure, upon retrieving of said line and against the biasing force of said resilient means, toward said body member; and
   (e) the resiliency of said resilient means being such as to return said lure outwardly away from said body member upon slackening of said leader means following retrieving of the fishing line.

2. A fishing rig as in claim 1, wherein said body member and said lure have a buoyancy such that the same will float upon the surface of a body of water.

3. A fishing rig as in claim 1, wherein said body member is hollow and has a buoyancy such that when empty will float upon the surface of a body of water and when filled with water will sink.

4. A fishing rig as in claim 1, and further including a buoyant member carried by said elongate resilient means adjacent the one of its said ends connected to said lure.

5. A fishing rig as in claim 1, wherein said elongate resilient means comprises a wire formed of corrosion-resistant metal.

6. A fishing rig adapted to be used in connection with a retrievable fishing line, comprising:
   (a) a lure;
   (b) an elongate, generally cylindrical, hollow body member formed of transparent material and having a closed inner end and an open outer end;
   (c) removable plug means carried by said body member within said open end thereof for sealing the same, the buoyancy of said body member being such that when empty said body member will float upon the surface of a body of water;
   (d) eyelet means carried by and extending from said body member on one side of the cylindrical exterior surface thereof;
   (e) an elongate resilient wire connected at its inner end to said body member and at its outer end to said lure for resiliently maintaining said lure a spaced distance outwardly away from said body member;
   (f) elongate leader means adapted to be connected at its inner end to a fishing line and connected at its outer end to said lure and passing loosely through said eyelet means carried by said body member for moving said lure, upon retrieving of the fishing line and against the biasing force of said elongate resilient wire, toward said body member; and (g) the resiliency of said wire being such as to return said lure outwardly away from said body member upon slackening of said leader means following retrieving of the fishing line.

7. A fishing rig as in claim 6, wherein said inner end of said wire is connected adjacent said inner end of said body member and said wire extends generally longitudinally of said body member toward and outwardly beyond said outer end of said body member.

8. A fishing rig as in claim 6, wherein said inner end of said wire is connected to said body member on that side thereof opposite said eyelet means extending from said one side thereof.

9. A fishing rig as in claim 6, wherein said eyelet means comprises a pair of lug members disposed adjacent said inner and outer ends of said body member and having bores extending therethrough, the axes of said bores being in alignment and extending in spaced parallel relationship to the main longitudinal axis of said body member.

10. A fishing rig adapted to be used in connection with a retrievable fishing line, comprising:

(a) a floating lure;
(b) an elongate, generally cylindrical, hollow body member formed of transparent material and having a closed inner end and an open outer end;
(c) a tapered, removable plug carried by said body member within said open end thereof for sealing the same, said plug having an integral flange extending outwardly therefrom;
(d) eyelet means carried by and extending from said body member adjacent said inner and outer ends and on one side of the cylindrical exterior surface thereof;
(e) an elongate resilient wire formed of corrosion-resistant metal, one end of said wire being connected to said body member adjacent said inner end thereof and on that side of said body member opposite said eyelet means carried thereby, said wire extending from said one end thereof generally longitudinally of said body member toward and outwardly beyond said outer end of said body member, said wire having its other end connected to said lure and resiliently maintaining said lure a spaced distance outwardly away from said body member;
(f) elongate leader means adapted to be connected at its inner end to the fishing line and extending freely therefrom through said eyelet means carried by said body member, the outer end of said leader means being connected to said lure for moving said lure, upon retrieving of the fishing line and against the biasing force of said wire, toward said outer end of said body member; and
(g) the resiliency of said wire being such as to return said lure outwardly away from said outer end of said body member upon slackening of said leader means following retrieving of the fishing line.

11. A fishing rig as in claim 10, and further including a cork carried by said wire adjacent said lure.

No references cited.

ABRAHAM G. STONE, *Primary Examiner.*